United States Patent Office 3,436,397
Patented Apr. 1, 1969

3,436,397
DIBENZOCYCLOHEPTEN-5-YLIDENE THIAZOLIDINONES
Martin A. Davis, Montreal, Quebec, and David J. Campbell, Pincourt, Quebec, Canada, assignors to American Home Products Corporation, New York, N.Y., a corporation of Delaware
No Drawing. Filed May 23, 1966, Ser. No. 551,950
Int. Cl. C07d *91/16;* A61k *27/00;* A01n *9/22*
U.S. Cl. 260—306.7     5 Claims This invention relates to novel chemical compounds having useful biological properties. More particularly this invention relates to novel 5H-dibenzo[a,d]cyclohepten-5-ylidene thiazolidinones which may be represented by the general Formula I:

[Structure of Formula I showing dibenzocycloheptene fused to thiazolidinone ring with HN, S, O= and R substituent]

in which R represents hydrogen or a lower alkyl containing from 1–4 carbon atoms, for example the methyl group.

The compounds of this invention may be obtained from the condensation of 10,11-dihydro-5H-dibenzo[a,d]cycloheptene-5-thiocarboxamide of Formula II, prepared according to the general procedure described by E. C. Kornfeld, in J. Org. Chem., vol. 16, p. 131 (1951), by reacting 10,11 - dihydro - 5H - dibenzo[a,d]cycloheptene-5-carbonitrile either with ammonia and hydrogen sulfide in ethanol under pressure, or with thioacetamide in dimethylformamide with hydrogen chloride according to the general procedure described by E. C. Taylor et al. in J. Am. Chem. Soc., vol. 82, p. 2656 (1960), with alpha halo carboxylic acid esters, to obtain the 4-thiazolidinone derivatives of Formula I. The reaction may be carried out in an inert solvent in which the reactants are soluble, and at an elevated temperature. In practice it is advantageous to perform the reaction in a boiling chloroform solution for periods of time in the order of 24 hours. The product may be isolated by evaporation of the solvent followed by washing and purified by recrystallization from an appropriate solvent. These reactions may be shown diagrammatically as follows, the symbol "Hal" representing a halogen with an atomic weight greater than 19:

[Reaction scheme showing Formula II (with $H_2N$—C(=S)— group) + Hal-CHCO$_2$C$_2$H$_5$ with R substituent, yielding Formula I]

The compounds of this invention have important biological properties and are useful as medicaments. They possess larvicidal action against horse strongyles and may be used to decontaminate premises or pastures which have been infected with members of the Strongylidae family, for example hookworms, Trichostrongylidae, or Metastrongylidae. For such purpose the compounds may be formulated as suspensions in an appropriate vehicle, for example, water, so as to contain an amount of the active ingredient of from 0.01 to 0.001 mole per liter. The compounds also have anthelminthic effect against *Syphacia obvelata* and are useful for the treatment of pinworm infestations in mammals. They also possess antibacterial activities against certain gram-positive and gram-negative organisms.

The following descriptive examples will serve to illustrate this invention but are not to be construed so as to limit it thereto.

EXAMPLE 1

A solution of 10,11-dihydro-5H-dibenzo[a,d]cycloheptene-5-thiocarboxamide (7.6 g., 0.03 mole) and ethyl bromoacetate (5.4 g., 0.03 mole) in chloroform (200 ml.) is heated under reflux for 22 hours; hydrogen bromide is evolved. The solvent is removed by evaporation and the residue is washed with water and dried. The product is purified by recrystallization from toluene or, on a small scale, by sublimation in vacuo. There is obtained 2-(10,11-dihydro - 5H - dibenzo[a,d]cyclohepten - 5 - ylidene)-thiazolidinone of M.P. 235–236° C. Elemental analysis confirms the empirical formula $C_{18}H_{15}NOS$.

EXAMPLE 2

A solution of the thiocarboxamide used in Example 1 (7.6 g., 0.03 mole) and ethyl 2-bromopropionate (6.0 g., 0.03 mole) in chloroform (250 ml.) is heated under reflux for 24 hours. The solvent is removed by evaporation and the residue is recrystallized from either ethyl acetate or acetonitrile. There is obtained 2(10,11-dihydro-5H-dibenzo[a,d]cyclohepten - 5-ylidene) - 5 - methyl - 4 - thiazolidinone of M.P. 181–182° C. Elemental analysis confirms the empirical formula $C_{19}H_{17}NOS$.

In the same manner, but using ethyl 2-bromobutyrate or ethyl 2-bromovalerate as the starting materials, there are obtained 2-(10,11-dihydro-5H-dibenzo[a,d]cyclohepten-5-ylidene)-5-ethyl-4-thiazolidinone and 2-(10,11-dihydro - 5H - dibenzo[a,d]cyclohepten - 5 - ylidene)-5-propyl-4-thiazolidinone, respectively.

We claim:
1. A compound of the formula

[Structure showing dibenzocycloheptene fused to thiazolidinone ring with HN, S, O= and R substituent]

wherein R is selected from the group which consists of hydrogen and lower alkyl containing from one to four carbon atoms.

2. 2 - (10,11 - dihydro - 5H - dibenzo[a,d]cyclohepten-5-ylidene)-thiazolidinone, as claimed in claim 1.

3. 2 - (10,11 - dihydro - 5H - dibenzo[a,d]cyclohepten-5-ylidene)-5-methyl-4-thiazolidinone, as claimed in claim 1.

4. 2 - (10,11 - dihydro - 5H - dibenzo[a,d]cyclohepten-5-ylidene)-5-ethyl-4-thiazolidinone, as claimed in claim 1.

5. 2 - (10,11 - dihydro - 5H - dibenzo[a,d]cyclohepten-5-ylidene)-5-propyl-4-thiazolidinone, as claimed in claim 1.

References Cited

UNITED STATES PATENTS 3,182,063   5/1965   Satzinger _____ 260—306.7

ALTON D. ROLLINS, *Primary Examiner.*

U.S. Cl. X.R.

424—270